US007656546B2

(12) United States Patent
Lay et al.

(10) Patent No.: US 7,656,546 B2
(45) Date of Patent: Feb. 2, 2010

(54) NOTIFYING A COMPUTER USER OF PRINTING WITH TEMPORARY PRINTER PROPERTIES

(75) Inventors: D. Travis Lay, Meridian, ID (US); Travis J. Parry, Bosie, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1717 days.

(21) Appl. No.: 10/128,370

(22) Filed: Apr. 23, 2002

(65) Prior Publication Data

US 2003/0197883 A1 Oct. 23, 2003

(51) Int. Cl.
*G06F 3/12* (2006.01)

(52) U.S. Cl. .................. 358/1.15; 358/1.1; 358/1.13; 358/1.14; 358/1.16

(58) Field of Classification Search ................ 358/1.13, 358/1.1, 1.14, 1.15, 1.16
See application file for complete search history.

(56) References Cited

U.S. PATENT DOCUMENTS

| 5,050,098 | A | * | 9/1991 | Brown et al. ............... 358/1.13 |
| 5,694,618 | A | * | 12/1997 | Hibino ........................ 710/46 |
| 6,268,924 | B1 | * | 7/2001 | Koppolu et al. ............ 358/1.13 |
| 6,615,372 | B1 | * | 9/2003 | Wang ......................... 714/46 |

* cited by examiner

*Primary Examiner*—David K Moore
*Assistant Examiner*—Benjamin O Dulaney

(57) ABSTRACT

In a computer system, print jobs are printed on a selected printer utilizing the printer properties in effect for that printer at the time that the print job was spooled for printing. Typically, the printer prints utilizing default printer properties. However, users may temporarily override these default values by specifying temporary printer properties from within applications. A printer properties notification is provided to a user when temporary printer properties are in effect when printing is initiated. Selection buttons provided during this notification allow the user to then indicate how to proceed.

21 Claims, 4 Drawing Sheets

NOTIFYING A COMPUTER USER OF PRINTING WITH TEMPORARY PRINTER PROPERTIES

FIELD OF THE INVENTION

The present invention generally relates to printer interfaces and, more specifically, to a Graphical User Interface (GUI) printer interface that provides a notification to a computer user of printing utilizing temporary printer properties.

BACKGROUND OF THE INVENTION

Printing in a typical computer system is typically controlled by the operating system. When using a Graphical User Interface (GUI) operating system, currently such as Windows® from Microsoft® or Macintosh® from Apple®, a user will select printing, typically either through a menu option or by depressing a button on a button bar. A printer driver will then format the requested printing for the selected printer and queue the printing in a print spool for printing. The printer driver will then download the printer commands that will result in printed pages into the selected printer. The printing is done in conformity with the printer properties in effect for the printer at the time the printing is commanded.

Printer drivers are typically supplied to computer users either by the printer vendor or by the operating system vendor. Since the sophistication of a printer driver user interface can help sell printers, printer vendors have produced evermore sophisticated printer drivers and printer driver interfaces. Some of the features or printer properties currently available in printer drivers and printer driver interfaces include: printing a single page of a document, the entire document, or a range of pages in the document; printing multiple copies of a document; printing the pages in a document in reverse order; printing multiple pages of a document on a single page of paper; landscape and portrait printing; printing utilizing paper from particular trays; printing on different page sizes; printing labels; duplex printing where both sides of a page are printed; and printing with watermarks. In the Windows® operating systems from Microsoft®, printing is done utilizing printer properties. If temporary printer properties are available, they are utilized. Otherwise, the default printer properties of a printer are utilized.

Currently, in such an environment, default printer properties are set or modified in a process that starts by opening a system Printers file folder. Within the system Printers file folder, a printer is selected and activated, typically by double clicking on an icon for the selected printer. A Printer menu is then launched and displayed for that printer that shows, among other things, the current queue or spool for the printer. From the File pull-down Properties menu for the Printer menu, a Printer Properties menu or set of menus is launched. The printer properties modifications made to the Printer Properties menu or set of menus become the default settings for this printer until changed. In the current Microsoft® Windows® environments, this currently requires that these printer properties changes or modification be written to the system Registry, where they are maintained as the default printer properties settings until changed.

Temporary printer properties are set in a similar manner from within application programs. In the Windows® operating systems from Microsoft®, these temporary printer properties are typically set either by selecting printing from the "File" menu or by selecting and activating a Print button in an application program. Either of these actions launches a "Print" menu. One of the options on the Print menu is the selection of which printer to use when more than one are available. Once the printer to be utilized is selected, a user can then also select and activate a "Properties" button. This typically will launch a printer or vendor-specific "Printer Properties" menu or set of menus corresponding to the selected printer. A Printer Properties menu is alternatively launched by selecting "Printer Properties" from the "File" pull-down menu of many applications. Printer properties for the selected printer can then be temporarily modified utilizing the associated Printer Properties menu or set of menus.

One of the problems that arises when changing printer properties from within application programs is that many, if not most, of these temporary printer properties automatically change back to their default values for the currently selected printer after an undefined period of time. This process of reverting printer properties back to default values for this printer appears to a user to be somewhat arbitrary. For example, many of these temporary printer properties are maintained by an application. Thus, as long as that application continues to execute, any print requests on the currently selected printer will utilize these temporary printer properties. On the other hand, the temporary printer properties can be lost when an application terminates. In some other instances, temporary printer properties only remain changed for a single print request, at which time they are reset to their default values. Another problem that arises is when printer settings and printer consumables are changed at the printer, unbeknownst to the user.

One result of temporarily modified printer properties reverting to their default values at what appear to a user to be arbitrary times is that sometimes print requests are printed with inappropriate settings. For example, if a user prints transparencies from a transparency printer tray and then goes on to do something else, he may be surprised when a subsequent print request also prints on transparencies. Alternatively, the user may be trying to utilize duplex printing, only to find that subsequent print requests end up being printed on one side of a page, since printer properties have been unexpectedly set back to their default values.

It would therefore be advantageous for a user of a computer with a Graphical User Interface operating system to know whether temporary or default printer properties are being utilized for printing.

SUMMARY OF THE INVENTION

In a computer system, print jobs are printed on a selected printer utilizing the printer properties in effect for that printer at the time that the print job was spooled for printing. Typically, the printer prints with default printer properties. However, users can temporarily override these values by specifying temporary printer properties from within applications. When a user directs that a print job is to be printed and temporary printer properties are in effect, the user is notified that the temporary printer properties are in effect and given a choice as to what to do. The user may accept printing utilizing the temporary printer properties, may reject such and print utilizing default printer properties, or may abort printing this print job entirely.

The user notification of utilizing temporary printer properties can preferably be enabled and disabled from a Printer Properties menu. The determination of precisely when to display the user notification can be more finely controlled from a Settings menu launched by selecting and activating a Settings button on the Printer Properties menu for a printer.

DETAILED DESCRIPTION OF THE INVENTION

Figure 1:
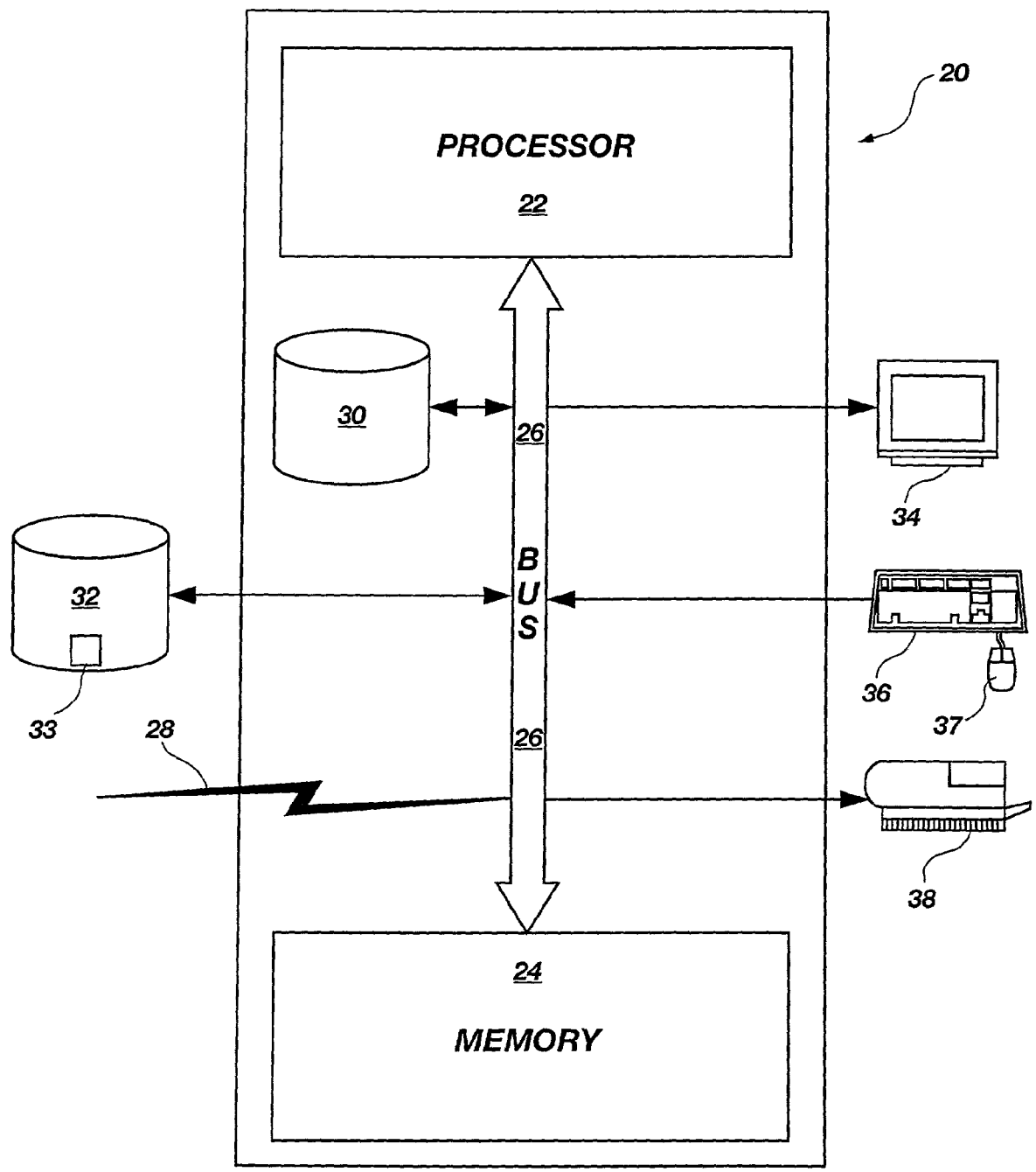
FIG. 1 is a block diagram illustrating an exemplary General Purpose Computer in a data processing system.

FIG. 1 is a block diagram illustrating an exemplary general purpose computer 20 in a data processing system. The general purpose computer 20 has a computer processor 22 and memory 24, connected by a bus 26. Memory 24 is a relatively high-speed, machine-readable medium and includes volatile memories, such as DRAM and SRAM, and non-volatile memories, such as ROM, FLASH, EPROM, and EEPROM. Also connected to the bus 26 are secondary storage 30, external storage 32, output devices such as a monitor 34, input devices such as a keyboard 36 (with mouse 37), and printers 38. Secondary storage 30 includes machine-readable media such as hard disk drives (or DASD) and disk sub-systems. External storage 32 includes machine-readable media such as floppy disks, removable hard drives, magnetic tapes, CD-ROM, and even other computers, possibly connected via a communications line 28. The distinction drawn here between secondary storage 30 and external storage 32 is primarily for convenience in describing the present invention. As such, it should be appreciated that there is substantial functional overlap between these elements. Computer software such as printer drivers, operating systems, and application programs can be stored in a computer instruction storage medium, such as memory 24, secondary storage 30, or external storage 32. Executable versions of computer software 33 can be read from a computer readable medium such as external storage 32, secondary storage 30, and non-volatile memory and loaded for execution directly into volatile memory, executed directly out of non-volatile memory, or stored on the secondary storage 30 prior to loading into volatile memory for execution.

Figure 2:
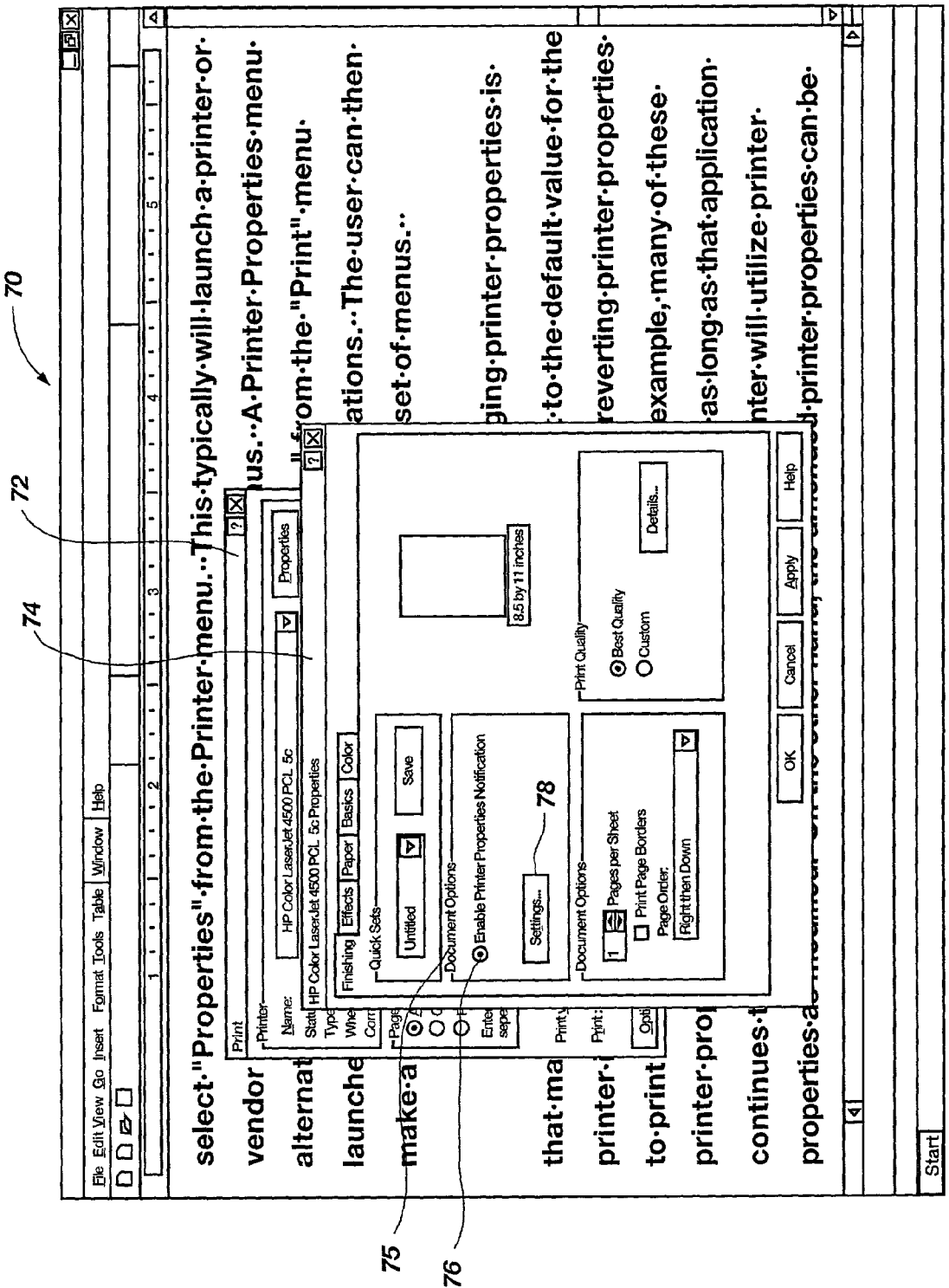
FIG. 2 is a diagram illustrating a first Graphical User Interface screen on a computer monitor as shown in FIG. 1.

FIG. 2 is a diagram illustrating a first Graphical User Interface screen 70 on a computer monitor 34 as shown in FIG. 1. The Graphical User Interface screen 70 in FIG. 2 shows a Print menu 72 that is typically launched either by selecting and activating a "Print" button or from a "Print" selection on a "File" pull-down menu from within an application. A Printer Properties menu 74 is then launched by selecting and activating a "Properties" button on the Print menu 72. The Printer Properties menu 74 includes an additional "Printer Properties Notification" 75 set of properties. The Printer Properties Notification 75 set of properties includes a Printer Properties Notification Enable 76 option button or check box for enabling Printer Properties Notification titled "Enable Printer Properties Notification". The Printer Properties Notification 75 set of properties alternatively also contains a Printer Properties Notification Settings button 78 for launching a menu to more finely tailor the printer properties notification process, for example, by specifying which printer properties are to be subject to printer properties notification.

When a Graphical User Interface user modifies printer properties, he will typically launch a Printer Properties menu 74 from a Print menu 72 from within an application. The present invention allows the user to specify whether to alert a user that temporary printer properties for the selected printer are being utilized to print instead of the default values for that printer. In this embodiment, the user enables this capability by selecting or activating the Printer Properties Notification Enable 76.

In an embodiment of the invention, enablement of Printer Properties Notification and, alternately, fine tuning of such are themselves printer properties. These printer properties thus preferably have their default values set in the Printer Properties menu or set of menus launched from a Printer menu launched from a Graphical User Interface desktop and their temporary values set in the Printer Properties menu or set of menus launched from within applications.

Figure 3:
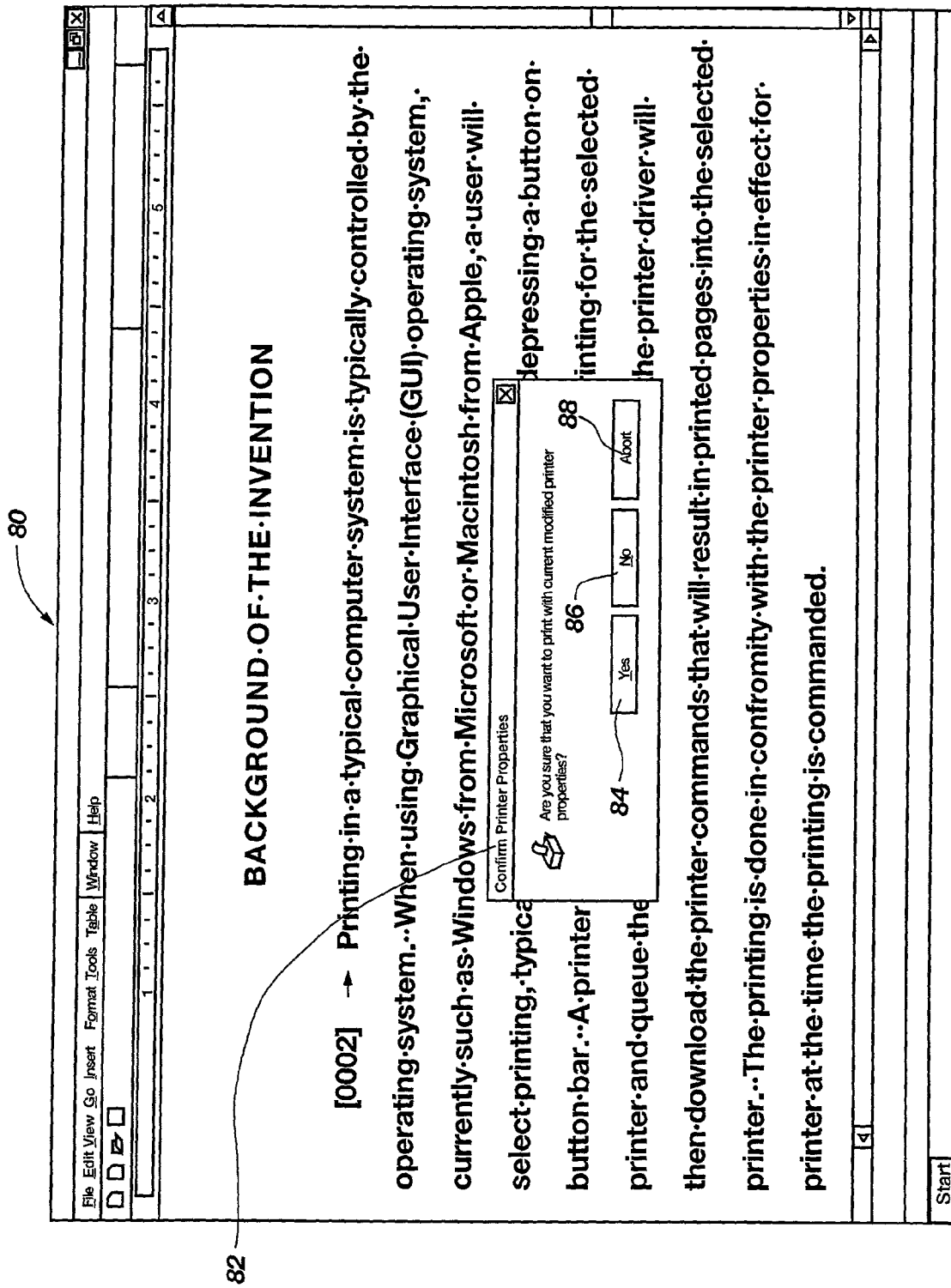
FIG. 3 is a diagram illustrating a second Graphical User Interface screen on a computer monitor as shown in FIG. 1.

FIG. 3 is a diagram illustrating a second Graphical User Interface screen 80 on a computer monitor 34 as shown in FIG. 1. This screen shows a Printer Properties Notification box 82, in accordance with a preferred embodiment of the present invention. A user typically activates printing in a Microsoft® Windows® environment by selecting and activating an "OK" button in a Print menu 72, (as shown in FIG. 2), or may just hit a carriage return, since the "OK" button is typically the default button on the Print menu 72. When a print driver then begins the printing process, a check is made whether temporary printer properties are currently in effect for the selected printer, and if temporary printer properties are in effect, then the Printer Properties Notification box 82 is displayed to the computer user. Additionally, a check may be made whether the temporary printer properties correspond to the job to be printed. The Printer Properties Notification box 82 displays a message, such as "Are you sure that you want to print with current modified printer properties?", and preferably has three options buttons: "Yes" 84, "No" 86, and "Abort" 88. If the user selects the default "Yes" button 84, the print job is printed utilizing the temporary printer properties currently in effect. If the user selects the "No" button 86, the default printer properties are utilized for printing. If the user selects the "Abort" button 88, printing is aborted, giving the user a chance to check and/or modify printer properties. Additionally, the user may be notified when the temporary printer properties are not appropriate for the job to be printed. For example, "Print Job X is set to print transparencies, however, none of the current trays in the printer are loaded with transparencies. Do you want to continue printing?"

Figure 4:
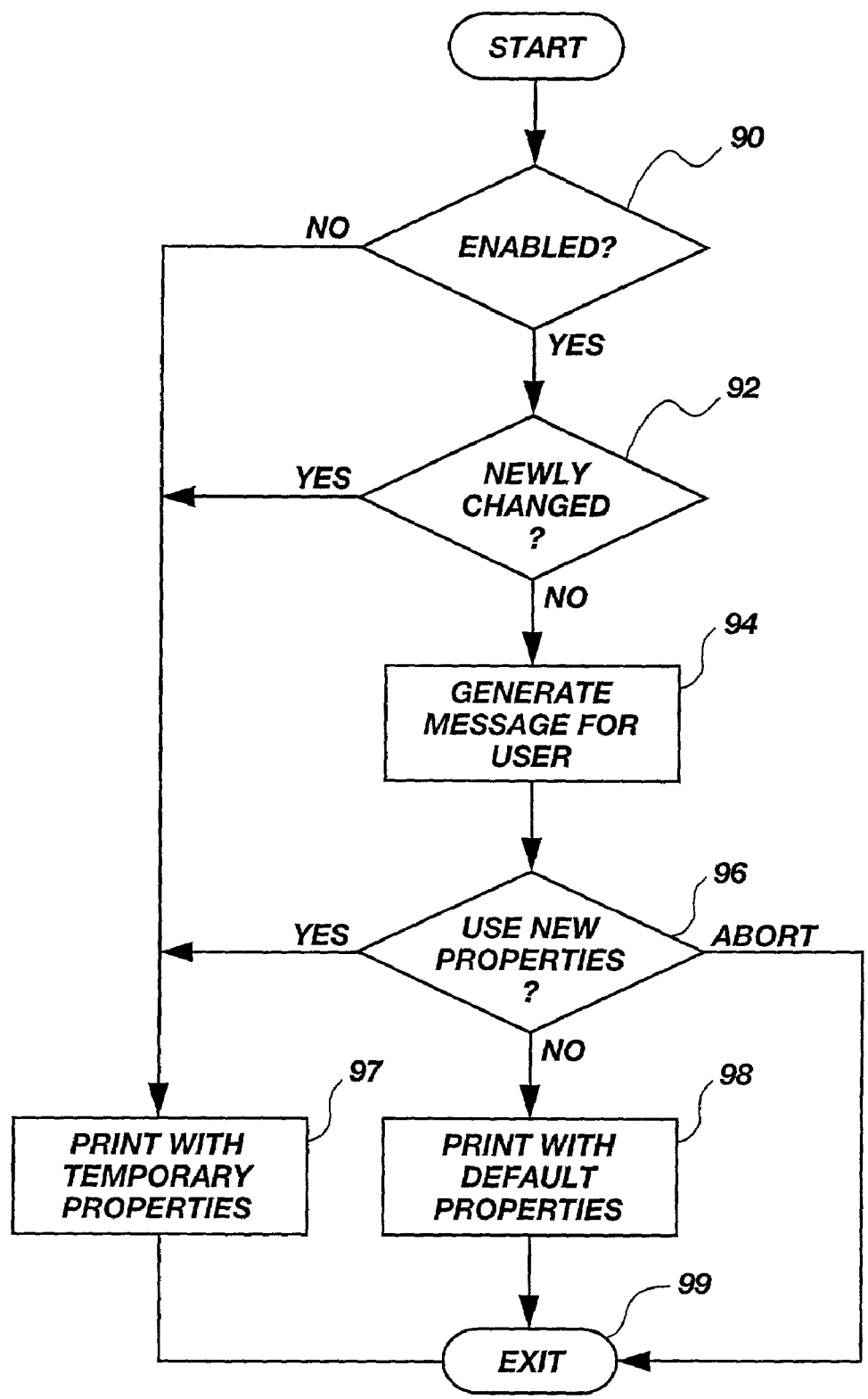
FIG. 4 is a flowchart illustrating an embodiment of the present invention.

FIG. 4 is a flowchart illustrating an embodiment of the present invention. When temporary printer properties are in effect when printing is initiated on a printer, a check is made to determine whether Printer Properties Notification is enabled, step 90. In the embodiment shown in FIG. 2, Printer Properties Notification is enabled by selecting or activating the Printer Properties Notification Enable 76. Other methods of enabling Printer Properties Notification and printer properties timed retention are also within the scope of the present invention. For instance, Printer properties may be retained for any desired period of time by using Printer Properties Notification Enable 76. If Printer Properties Notification is not enabled, step 90, then the driver prints with the temporary printer properties in effect, step 97.

However, if the Printer Properties Notification is enabled, step 90, a test is then made to determine whether the printer properties are newly modified, step 92. If the printer properties were modified during the most recent activation of the Print menu 72, it is assumed that the user already knows that he is printing with these temporary printer properties. In this case, the driver prints with the temporary printer properties in effect, step 97.

If the printer properties were modified by an earlier print request instead, the Printer Properties Notification box 82 shown in FIG. 3 is displayed to the computer user, step 94. Upon the user indicating his choice of actions in response to the Printer Properties Notification box 82, a decision is made whether to utilize the temporary printer properties, step 96. If the user has selected to continue the printing utilizing the temporary printer properties, by selecting the "Yes" button 84, the driver prints with the temporary printer properties in effect, step 97. If the user has selected to continue the printing utilizing the default printer properties, by selecting the "No" button 86, the driver prints with the default printer properties in effect, step 98. If the user has selected to abort printing, by selecting the "Abort" button 88, no printing is done. In all cases, the print process is then complete, and the driver exits, step 99.

The above is illustrative only. Other methods of implementing the present invention are also within the scope of this invention. For example, in an alternate embodiment, a Printer Properties Notification box 82 is also displayed when a user is printing utilizing default printer properties. In another embodiment, the Printer Properties Notification box 82 has two choices: to print utilizing the temporary printer properties or to abort printing. In yet another embodiment, the check for newly changed printer properties, step 92, is omitted.

Additionally, in yet another embodiment, the Printer Properties Notification Settings button 78 launches a Printer Properties Notification Settings menu that allows a user to more finely tune the Printer Properties Notification process. For example, a user could be provided an option to change which printer properties would cause the Printer Properties Notification box 82 to be displayed, and when to display such.

An apparatus and method for displaying a Printer Properties Notification box 82 to a computer user when temporary printer properties are in effect has been disclosed. This provides a mechanism for a computer user to know when these temporary properties are still in effect for a printer, and thus reduces the frequency at which a computer user prints to a printer with unexpected printer properties.

Those skilled in the art will recognize that modifications and variations can be made without departing from the scope of the present invention. Therefore, it is intended that this invention encompass all such variations and modifications as fall within the scope of the appended claims.

What is claimed is:

1. A method of notifying a user regarding a current print request on a selected printer, the method comprising:
   determining whether a temporary set of printer properties is in effect for the selected printer for the current print request; and
   notifying the user if the temporary set of printer properties is determined to be in effect for the current print request.

2. The method in claim 1 which further comprises:
   receiving an indication how to proceed from the user after being notified.

3. The method in claim 2 which further comprises:
   printing with the temporary set of printer properties in response to receiving the indication.

4. The method in claim 2 which further comprises:
   printing with a default set of printer properties in response to receiving the indication.

5. The method in claim 2 which further comprises:
   not printing in response to receiving the indication.

6. The method in claim 1 further comprising:
   determining whether the temporary set of printer properties in effect for the selected printer for the current print request match settings of the current print request; and
   notifying the user if the temporary set of printer properties that are determined to be in effect for the current print request do not match the settings of the current print request.

7. The method in claim 1 wherein:
   the notifying is not performed when the user has modified the current set of temporary printer properties during an initiation of the current print request.

8. The method of claim 1 wherein the temporary set of printer properties in effect for the selected printer for the current print request is retained for a desired period of time.

9. A system for notifying a user regarding a current print request on a printer comprising:
   a computer instruction storage medium containing:
      a set of computer instructions for determining whether a temporary set of printer properties is in effect for the printer for the current print request; and
      a set of computer instructions for notifying the user if the temporary set of printer properties is determined to be in effect for the current print request.

10. The system in claim 9 wherein the computer instruction storage medium further contains:
    a set of computer instructions for receiving an indication how to proceed from the user after being notified.

11. The system in claim 10 wherein the computer instruction storage medium further contains:
    a set of computer instructions for printing with the temporary set of printer properties in response to receiving the indication.

12. The system in claim 10 wherein the computer instruction storage medium further contains:
    a set of computer instructions for printing with a default set of printer properties in response to receiving the indication.

13. The system in claim 10 wherein the computer instruction storage medium further contains:
    a set of computer instructions for not printing in response to receiving the indication.

14. The system in claim 9 wherein the computer instruction storage medium further contains:
    a set of computer instructions for determining whether the notifying is configured to be performed.

15. The system in claim 9 wherein:
    the set of computer instructions is configured to not perform the notifying when the user has modified the current set of temporary printer properties during an initiation of the current print request.

16. A computer readable medium having computer readable instructions thereon for:
    determining whether a temporary set of printer properties is in effect for a printer for a current print request from a user; and
    notifying the user if the temporary set of printer properties is determined to be in effect for the current print request.

17. The computer readable medium in claim 16 further having thereon:
    a set of computer readable instructions for receiving an indication how to proceed from the user after being notified.

18. The computer readable medium in claim 17 further having thereon:
    a set of computer readable instructions for printing with the temporary set of printer properties in response to receiving the indication.

19. The computer readable medium in claim 17 further having thereon:

a set of computer readable instructions for printing with a default set of printer properties in response to receiving the indication.

20. The computer readable medium in claim 17 further having thereon:

a set of computer readable instructions for not printing in response to receiving the indication.

21. The computer readable medium in claim 16 further having thereon:

a set of computer readable instructions for not notifying the user when the user has modified a current set of temporary printer properties during an initiation of the current print request.

* * * * *